US012400384B2

(12) United States Patent
Tensmeyer et al.

(10) Patent No.: US 12,400,384 B2
(45) Date of Patent: Aug. 26, 2025

(54) REFLOWING DOCUMENTS TO DISPLAY SEMANTICALLY RELATED CONTENT

(71) Applicant: Adobe Inc., San Jose, CA (US)

(72) Inventors: Christopher Tensmeyer, Fulton, MD (US); Fuxiao Liu, Baltimore, MD (US); Hao Tan, Santa Clara, CA (US); Ani Nenkova, Philadelphia, PA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/460,401

(22) Filed: Sep. 1, 2023

(65) Prior Publication Data

US 2025/0078350 A1    Mar. 6, 2025

(51) Int. Cl.
| | |
|---|---|
| *G06F 40/131* | (2020.01) |
| *G06F 3/04842* | (2022.01) |
| *G06F 3/04845* | (2022.01) |
| *G06T 11/60* | (2006.01) |

(52) U.S. Cl.
CPC .......... *G06T 11/60* (2013.01); *G06F 3/04842* (2013.01); *G06F 3/04845* (2013.01); *G06F 2203/04803* (2013.01); *G06T 2200/24* (2013.01)

(58) Field of Classification Search
CPC . G06T 11/60; G06T 2200/24; G06F 3/04842; G06F 3/04845; G06F 2203/04803
See application file for complete search history.

(56) References Cited

U.S. PATENT DOCUMENTS

| | | | | |
|---|---|---|---|---|
| 8,539,342 | B1* | 9/2013 | Lewis | G06F 40/131 |
| | | | | 715/251 |
| 9,766,782 | B2* | 9/2017 | Migos | G09B 5/02 |
| 11,176,310 | B2* | 11/2021 | Agrawal | G06F 40/103 |
| 2009/0210828 | A1* | 8/2009 | Kahn | G06F 3/0484 |
| | | | | 715/205 |
| 2012/0096344 | A1* | 4/2012 | Ho | G06F 16/9577 |
| | | | | 715/249 |

OTHER PUBLICATIONS

Devlin et al. "BERT: Pre-training of Deep Bidirectional Transformers for Language Understanding", 2019, 16 pgs. Bert.pdf (Year: 2019).*

Liu, F., et al., "Upgrading the Newsroom: An Automated Image Selection System for News Articles," ACM Transactions on Multimedia Computing, Communications, and Applications, vol. 16, Issue 3, Article No. 81, Jul. 2020, pp. 1-28.

Muraoka, M., et al., "Image Position Prediction in Multimodal Documents," Proceedings of the 12th Language Resources and Evaluation Conference, May 2020, pp. 4265-4274.

(Continued)

*Primary Examiner* — Haoshian Shih
(74) *Attorney, Agent, or Firm* — Nicholson De Vos Webster & Elliott LLP

(57) ABSTRACT

Embodiments are disclosed for reflowing documents to display semantically related content. The method may include receiving a request to view a document that includes body text and one or more images. A trimodal document relationship model identifies relationships between segments of the body text and the one or more images. A linearized view of the document is generated based on the relationships and the linearized view is caused to be displayed on a user device.

20 Claims, 9 Drawing Sheets

(56) References Cited

OTHER PUBLICATIONS

Radford, A., et al., "Learning Transferable Visual Models From Natural Language Supervision," Proceedings of the 38th International Conference on Machine Learning, PMLR 139, Feb. 2021, pp. 1-16.

Shibata, Y., et al., "Byte Pair Encoding: A Text Compression Scheme That Accelerates Pattern Matching," Sep. 1999, pp. 1-13.

\* cited by examiner

REFLOWING DOCUMENTS TO DISPLAY SEMANTICALLY RELATED CONTENT

BACKGROUND

Increasingly, documents are viewed using various devices, from smaller mobile devices (e.g., smartphones and tablets) to laptops and full-size desktop computers. These devices typically have different size screens capable of different resolutions which affects how documents appear on each device. For example, a document optimized to be viewed on a full-size monitor may be difficult to read on a smartphone screen. Reflowing techniques are used to accommodate various screen sizes. A reflowing technique may take a document and resize or reshape it into a new form to be rendered on a different sized display.

Some document formats maintain structural information about a document which defines how glyphs, lines, images, or other low-level content are organized into paragraphs, headings, headers, columns, articles, or other high-level content, and also how the high-level content is organized to form the document. Reflowing text for such documents is simple, as the structural information can be used to automatically adjust the document for display in a different window or screen size.

Other document formats are fixed (e.g., static) and do not include structural information. Rather than structural information, static documents define where on a page a character, line, curve, etc. is printed or rendered. This means that these documents will appear the same regardless of what processor, hardware, operating system, screen size, etc. generates or displays the document. While this is effective for ensuring they accurately reproduce the layout designed by the document's author, it can result in a document that is difficult to read on smaller screens. Accordingly, the structure of the static document must first be inferred before it can be reflowed.

SUMMARY

Introduced here are techniques/technologies that enable documents to be reflowed while preserving spatial alignment between text and related images from the document. Documents are reflowed based on structural information about the documents. This may include structural information that is encoded into the document itself or inferred from the document using structure extraction techniques. However, the semantic relationships between particular segments of content and images (e.g., figures) within the document are generally unknown. This can result in a reflowed document in which, for example, an image has been relocated far away from its related section of text. This makes it difficult or impossible to view the content together, leading to a poor user experience.

Embodiments use a trimodal document relationship model to identify semantically related content in a document. In particular, the trimodal document relationship model receives body text segments, images, and associated image captions and generates contextual embeddings for each. The trimodal document relationship model is trained such that the contextual embeddings from related content are similar. Accordingly, the contextual embeddings are used to identify semantic relationships between sections of text and images in a given document. These relationships are then used during the reflow process to ensure that related content remains collocated in the resulting reflowed document.

Additionally, the identified semantic relationships are used to improve a user interface. For example, a section of text that is related to one or more images can be associated with a user interface element. When the user interface element is selected, a split screen view is presented with the associated image in one viewing pane and the text in the other viewing pane. Each viewing pane can be interacted with, e.g., to continue scrolling through the text content and/or to swipe through multiple related images.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
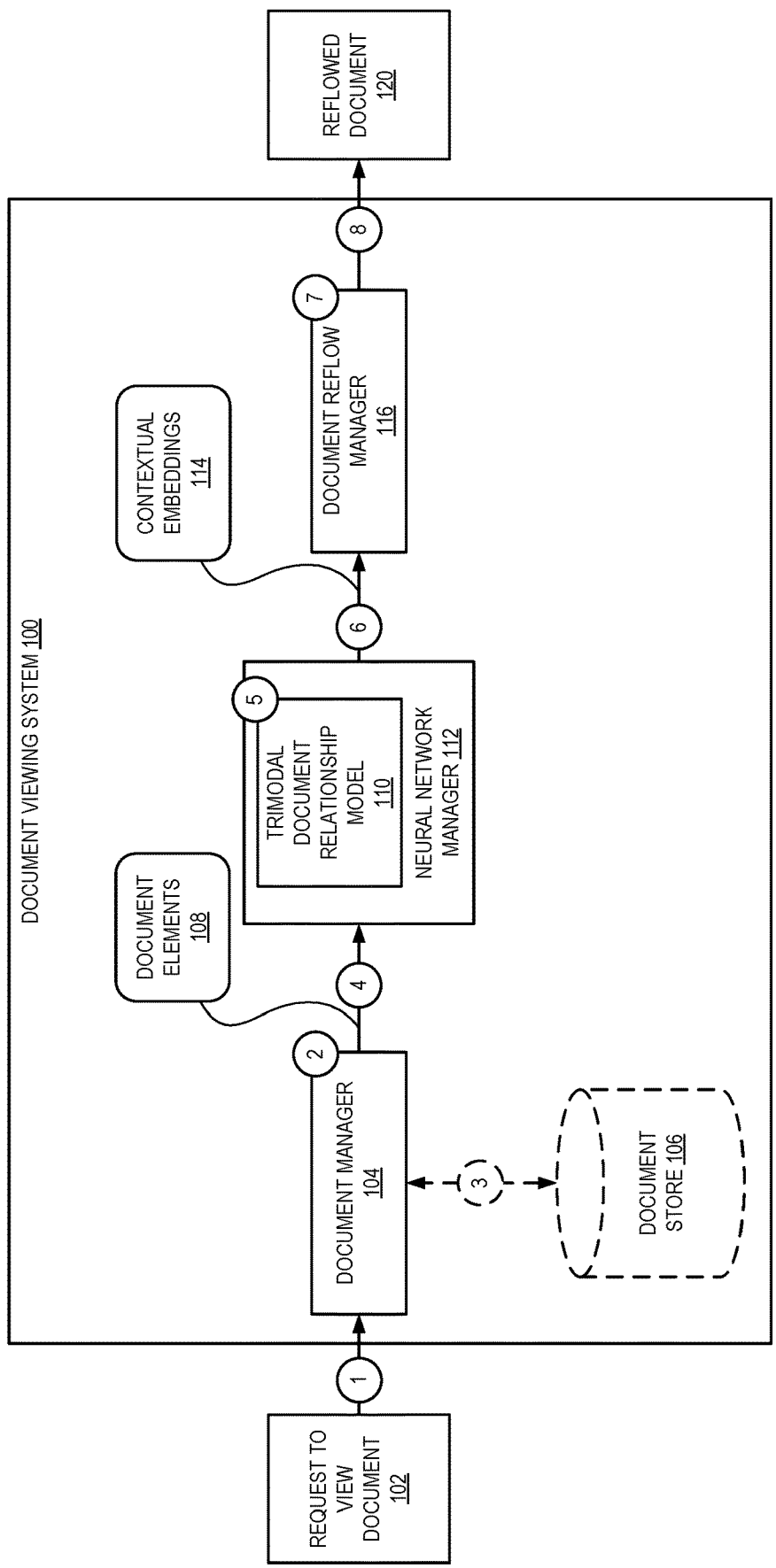
FIG. 1 illustrates a diagram of a process of reflowing a document to display semantically related content using a trimodal document relationship model in accordance with one or more embodiments.

One or more embodiments of the present disclosure include a document viewing system which reflows documents such that semantically related content is displayed together. Reflowed documents, both static and non-static, need to preserve the linearity of the body text. Otherwise, the reflowed document text will be out of order, making the document difficult or impossible to comprehend. Additionally, displaying semantically related images and text in close spatial proximity within documents helps comprehension. Non-static documents in which the text is reflowed to fit the size of the screen especially need to better preserve collocation of text and semantically relevant visuals. The semantic relationships between images and text are often not encoded in the document itself and are non-trivial to infer. Existing document structure extraction pipelines typically do not detect body text-figure relationships. However, these relationships are key for understanding how to reflow documents into a linear format since ideally, figures will be placed as close as possible to the body text it relates to.

Existing systems use machine learning to determine relationships between text and images. These models attempt to encode representations of images and text in the same vector space so that one can find an image representing a given text or the reverse. For example, one such image-text alignment model is CLIP (Contrastive Language-Image Pretraining). These models are trained to align short literal text descriptions of images with the image pixels, which makes them suitable for applications like generating/retrieving captions for images. Oftentimes, document body text does not literally describe collocated images because an image caption already provides a literal description or literally interpreting the image is easily done by the reader. Furthermore, existing models for image-text alignment do not jointly model the relationships between body text, literal captions, and associated images. Other techniques attempt to infer document structure using machine learning. However, existing document structure analysis models such as UniDoc, Layout-LMv3, et al. process pages one by one, but the figures may relate to text located on other pages. As such, these models cannot determine relationships across pages.

Another technique for indicating content relationships is through the use of intra-document hyperlinks. Intra-document hyperlinks, e.g., <a><href> HTML tags, are primarily how document authors indicate that some text is referring, or is related, to a figure within the document (or another document). However, document viewers typically treat hyperlinks as a navigation operation, move the user viewport to the linked anchor, and fail to continue to display the referencing body text (or display them in separate tabs). Additionally, hyperlinks of this nature cannot support relationships with multiple figures since there is a single destination URL. Hyperlinks also rely on the author manually specifying these relationships, which is not always comprehensively done.

Embodiments address these and other problems in the prior art through the use of a trimodal document relationship model. The trimodal document relationship model receives the body text (e.g., broken up into portions, such as sections, paragraphs, sentences, etc.), images, and corresponding image captions. Each mode (e.g., body text, images, captions) is processed by the trimodal document relationship model which generates contextual embeddings. Each contextual embedding encodes information about the specific element (e.g., text or image) it represents, along with position information within the document, and an element type (e.g., image, body text, or caption). Using these contextual embeddings, the model can predict sections of the body text that are semantically related to one or more images from the document. These semantic relationships can then be used to reflow the document such that related images are collocated with the appropriate sections of the reflowed body text.

Embodiments additionally use these semantic relationships to generate an improved reflowed view. For example, sometimes it is impossible to locate figures near related text. This could be due to higher priority reflow logic, such as not inserting content to interrupt a contiguous paragraph of text (even if it is large), or because the figure relates to multiple sections of body text and cannot be placed near to all of them in a linear ordering without duplicating the figure. As such, embodiments add a user interface element which indicates to a reader that there is a figure associated with a section of text. When the user interacts with the user interface element, a split screen view is presented, where the associated image(s) are presented in one screen and the associated text is presented in the other. This allows the reader to view both the figure and related text simultaneously. If there are multiple related figures, the figures are arranged in a carousel layout to allow the reader to cycle through them as they like.

Accordingly, existing techniques provide an improved user experience over prior techniques. For example, one image may be related to multiple sections of a document. Using the semantic relationships, the image can be made visible in the reflowed document without having to duplicate the image. This saves on storage and processing requirements. Additionally, by collocating the semantically related content, the user does not have to scroll back and forth between body text and a related figure because they are not near each other in the reflowed document.

FIG. 1 illustrates a diagram of a process of reflowing a document to display semantically related content using a trimodal document relationship model in accordance with one or more embodiments. A document viewing system 100 can enable a user to view a document on various devices. The document viewing system 100 may be implemented as a standalone application executing on a client device, as part of a document editor, layout design editor, or other application or suite of applications. As shown in FIG. 1, a user can interact with the document viewing system 100 by, for example, sending a request to view a document 102, at numeral 1. The request to view a document 102 may include a copy of the document to be viewed or may identify the document to be viewed (e.g., by name, identifier, storage location, etc.). In some embodiments, the request is provided by interacting with a user interface provided by the document viewing system, as discussed further below.

At numeral 2, the request is processed by document manager 104 to identify the document's elements. For example, in some embodiments, the document manager 104 may include a parser that reads structural information encoded into the document to identify sections, paragraphs, sentences, images, captions, and other elements of the document. Additionally, or alternatively, the document manager 104 may include one or more machine learning models trained to identify the elements of a static document that does not include any structural information. In some embodiments, document manager 104 can retrieve the requested document from a document store 106 or other storage location, as shown at numeral 3. Although the document store 106 is shown as being part of document viewing system 100, in some embodiments the document store 106 may include a local data store which may be located on the same device as the document viewing system, or the document store may include a remote data store which may be accessed over one or more networks.

Once the document's elements have been identified, the document elements 108 are provided to a trimodal document relationship model 110, as shown at numeral 4. The trimodal document relationship model is a machine learning model trained to predict relationships between body text and images. These semantic relationships may then be used during the reflowing process to ensure that related body text and images remain spatially collocated in the reflowed document. The trimodal document relationship model may be implemented as a neural network. As shown in FIG. 1, the trimodal document relationship model 110 may be executed by a neural network manager 112. The neural network manager 112 may include an execution environment including hardware (e.g., dedicated or reserved processor, accelerator, etc. resources) and software resources (e.g., libraries, etc.) to support the execution of one or more machine learning models.

A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. Additional details with respect to the use of neural networks within the document viewing system are discussed below with respect at least to FIG. 3.

At numeral 5, the trimodal document relationship model 110 processes the document elements 108 to generate contextual embeddings 114. The trimodal document relationship model receives three modes of input: body text, images, and corresponding image captions. As discussed further below, the document elements may be processed by an initial feature extractor layer which generates an image or text embedding representation of the corresponding elements. Additional embeddings represent the type of element being processed and its position in the document. The contextual embeddings 114 comprise and encoded representation of all of this information in a single vector space, allowing for related body text to be predicted given an image's contextual embedding (or vice versa).

As shown in FIG. 1, at numeral 6, the contextual embeddings 114 are provided to document reflow manager 116. Document reflow manager 116 can identify document text that is predicted to be related to one or more images using the contextual embeddings 114, at numeral 7. For example, as discussed further below, a similarity metric may be calculated for each image-text portion (e.g., sentence, paragraph, section, etc.) pair. The pairs having the highest similarity may be determined to be semantically related. Additionally, or alternatively, a threshold similarity may be used such that any pairs having a similarity greater than the threshold are semantically related. Therefore, in some embodiments, one image may be associated with multiple portions of text in the document and one portion of text may be associated with multiple images. The relationship data (e.g., the semantically related text-image pairs) may then be used, along with convention document reflowing techniques, to reflow the document such that spatial location of related content is preserved.

For example, in some embodiments, the document reflow manager 116 uses the structural information associated with the document to determine a linear order of the text elements of the document. The structural information may define a start and stop location of headings, section breaks, paragraphs, etc. As discussed, this structural information may be inferred using machine learning or other document structure extraction techniques or may be encoded into the document itself. Accordingly, each segment of text may be associated with a position in the linear order, allowing for the linearized view of the document to be constructed. The semantic relationship data associates images with sections of text. This allows the reflow manager to insert the images into the linearized view at specific locations associated with the associated segment of text. In some embodiments, the associated image or images may be inserted prior to the location of the associated text, after the location of the associated text, or at another spatially related position. For example, if an image is related to text at position 4 in the linearized view, then the image may be inserted between the content located at position 3 and the text at position 4.

The resulting reflowed document 120 is then output at numeral 8. This output may include causing the reflowed document 120 to be displayed on a display of the requesting device. For example, the request to view the document 102 may be received by the document viewing system 100 executing on a user's mobile device with an integrated screen. The document may be reflowed for the mobile device's screen and then rendered thereon. Additionally, or alternatively, the request may originate at a user device and be passed via one or more networks to a document viewing system 100 executing in a cloud environment. In such an instance, device information (e.g., screen size, resolution, and/or any other device data needed by convention reflowing techniques) may be provided with the request to view the document 102 to the document viewing system. The resulting reflowed document 120 may then be returned (e.g., via the one or more networks) from the cloud-based document viewing system to the client device, before being displayed by the user device.

Figure 2:
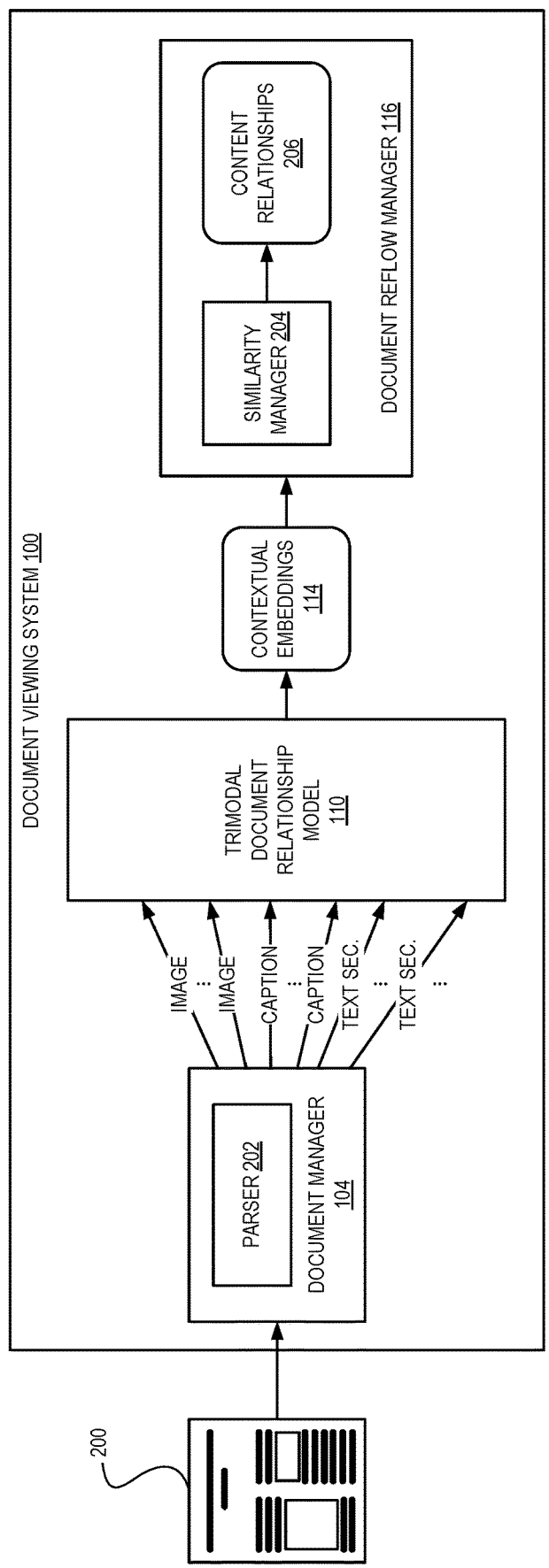
FIG. 2 illustrates a diagram of identifying content relationships in a document using a trimodal document relationship model in accordance with one or more embodiments.

FIG. 2 illustrates a diagram of identifying content relationships in a document using a trimodal document relationship model in accordance with one or more embodiments. As discussed, embodiments determine semantic relationships between body text and images within a document. This assumes that the structure of the document is known. For example, in FIG. 2, when the document manager 104 receives a new document 200 to prepare for reflowing, it first uses a parser 202 to determine the structure of the document 200. This parsing may be performed by processing the structure data encoded in the document or through other document structure extraction techniques (e.g., conventional or machine learning-based). In some embodiments, each document is broken down into elements, such as body text portions, images, and captions (if present). The body text may be further segmented into a sequence of sections, paragraphs, and sentences. As discussed, the trimodal document relationship model 110 then identifies a set of text sections/paragraphs/sentences related to each image.

In some embodiments, the granularity of the associated text (section vs paragraph vs sentence) can be set based on the use case and/or training data available. For example, Wikipedia articles may be used as one source of training data. Such articles typically include source markup that associates figure-captions with sections (e.g., multiple paragraphs that have a section heading). Additionally, by leveraging this weaker supervision with the section ground truth label, the model is often able to retrieve the most relevant sentence to the images.

As discussed, the trimodal document relationship model 110 outputs contextual embeddings 114 that encode information about each section of body text, each image, and each caption based on position information and element type. These contextual embeddings exist within the same embedding space such that related images and text sections are associated with similar embeddings. As such, the document reflow manager can use these contextual embeddings to identify semantically related content. For example, the document reflow manager may include similarity manager 204 which calculates a similarity between pairs of contextual embeddings (e.g., image-text pairs) to determine which pairs are most similar, resulting in content relationships 206. The content relationships may identify which text segments (e.g., sentences, sections, paragraphs, etc.) are associated with which images. These relationships may be many to one, one to many, one to one, many to many, etc. In some embodiments, where a section comprises multiple sentences, sentence contextual embeddings may enable the model to identify specific sentences with which an image is most associated. The similarity manager may then determine the related section to be the section of the body text that includes that sentence.

As discussed, in some embodiments, the document reflow manager 116 generates a linearized view of the document text based on the structural information associated with the document. The content relationship data 206 associates images with sections of text which enables the reflow manager to insert the images into the linearized view at specific locations associated with the associated segment of text (e.g., just prior to, just after, etc.). The resulting content relationships 206 can be maintained by document reflow manager 116 for use in reflowing the document 200. In some embodiments, the content relationships may be stored for use in future reflowing operations to be performed on the same document. As discussed further below, the content relationships may also be used to implement user interface controls which allow the user to simultaneously view text and image content while reading the reflowed document.

Figure 3:
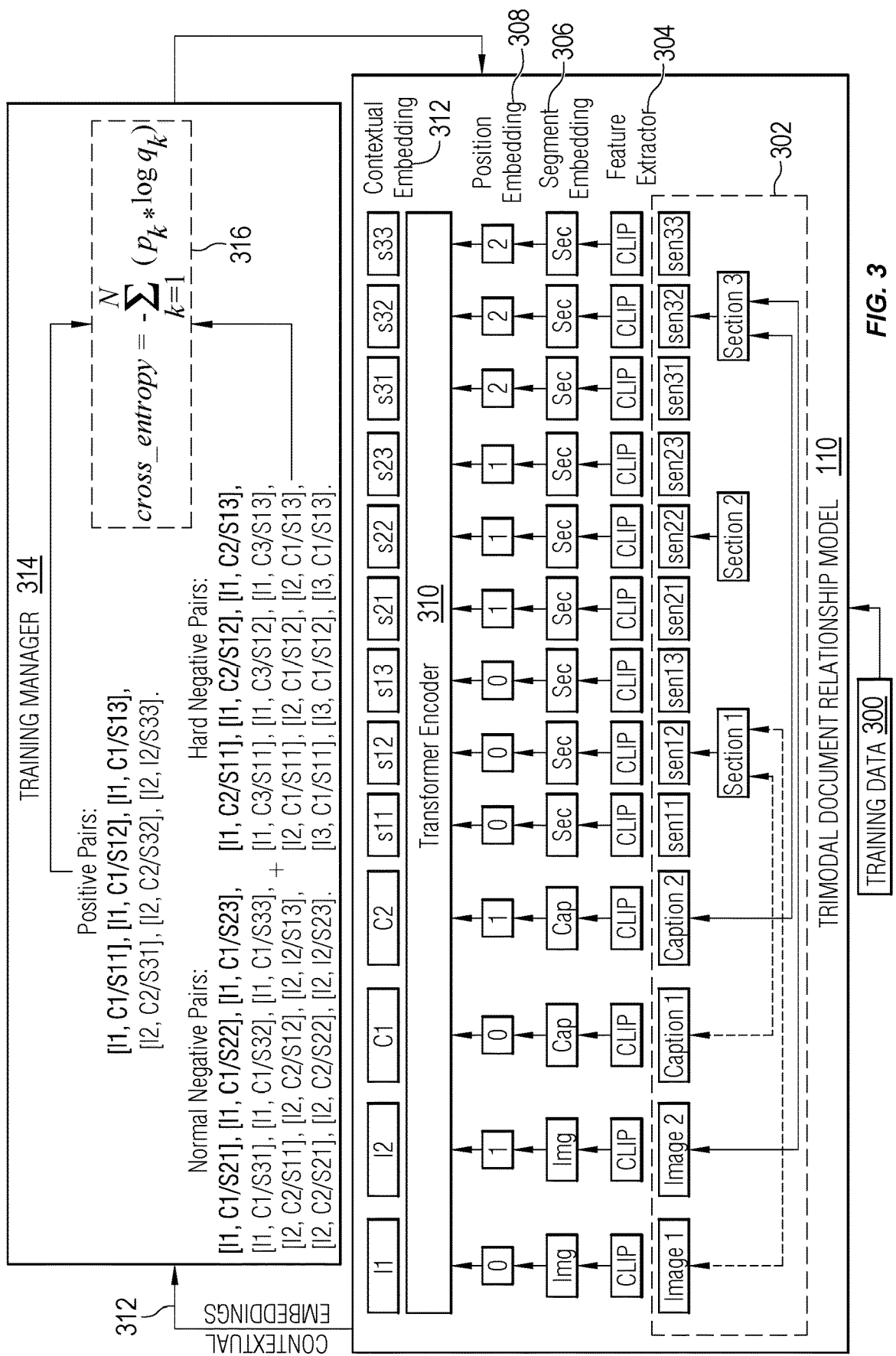
FIG. 3 illustrates a diagram of a trimodal document relationship model in accordance with one or more embodiments.

FIG. 3 illustrates a diagram of a trimodal document relationship model in accordance with one or more embodiments. As shown in FIG. 3, the trimodal document relationship model 110 may be trained using training data 300. In some embodiments, the training data 300 includes publicly accessible document data. One example of such data may include one or more documents obtained from English Wikipedia, or other document source. As noted, the model is trimodal in that it receives body text, images, and captions and learns to generate contextual embeddings corresponding to the trimodal inputs such that embeddings from semantically related inputs are similar.

Initially, the training data 300 documents are segmented into sections, images and captions. As discussed, the granularity of the sections may depend on the structural data associated with the training data documents. In some embodiments, training documents having 2 to 30 images and no more than 32 sections were used. In some embodiments, extracted images may be converted to an RGB format in order to guarantee quality. One example of a training data set used included 16,085 documents and 44,239 images. Each section has 8.14 sentences on average, the average sentence length is 22.3 words, and the average section length is 195.5 words. In addition, over 50% of the training documents have more than 10 sections and many sections do not have corresponding images. This is useful for training because the amount of text associated with an image is much larger than a typical training dataset used to align images with captions.

As shown at 302, the structural information associated with the training documents can be used to extract images, captions, and sections from the training documents. Further, the structural information may indicate the relationships between images and sections, allowing for ground truth pairs to be readily identified for training. Where the structural information indicates that an image is associated with a specific section, all of the sentences within that section may be considered as the ground truth since obtaining sentence-level associations would require additional manual labeling.

In some embodiments, during model training the training data 300 is divided into train/dev/test sets. The model can be trained with mini-batches of size 32 by using stochastic gradient descent. An optimization algorithm, such as AdamW, and a warm-up strategy with the initial learning rate of 0.001, may also be used. In some embodiments, model performance can be evaluated on both the image level and document level. At the image level, embodiments use Accuracy@N (N=1.3) to calculate the percentage of images where the ground truth section is among the top-N predicted sections. At the document level, the percentage of documents where all images in the document have a correct top-1 predicted section is measured.

As noted, one challenge of document-internal alignment is that sections are much longer than normal captions. As shown in FIG. 3, an initial feature extractor layer 304 uses CLIP to extract the text and image features. Various CLIP implementations or other equivalent feature extractors may be used. In some embodiments, to obtain an image embedding, a vision transformer of the CLIP feature extractor is adopted to extract N non-overlapping image patches and perform linear projection to map every patch into a 1D token. With injection of positional embedding and extra [CLS] token, the sequence of tokens is fed into transformer layers, and the output [CLS] token embedding is used to represent the image features. For text representation, embodiments employ lower-cased byte pair encoding (BPE) to tokenize the sentences in the documents. After that, CLIP's text encoder is utilized to generate the text representation.

Typically, the maximum length for the CLIP's text encoder is 77, which is much lower than the average length of the sections within documents. As such, a section may be represented by, the first sentence of the section, the last sentence of the section, or a weighted average of all of the sentences in the section. Alternatively, similarity may be calculated for every sentence separately, and the sentence with the maximum similarity may be selected. After that, the similarity score between the image embedding and section embedding is calculated and the section with the top score is selected as the prediction.

In some embodiments, weak supervision (e.g., image-section linking) is used to predict the image-sentence level alignment with contrastive learning algorithm. As shown in FIG. 3, the image or text embedding generated by the feature extractor 304 is combined with a segment embedding 306 indicating the type of element being processed (e.g., image, caption, or section of text), and a position embedding 308, indicating position information associated with the element. This combined embedding is then processed by a transformer encoder 310 to generate contextual embeddings 312. As shown, a contextual embedding is output by the transformer encoder for each input element. For example, the document being processed in FIG. 3 includes two images (image 1 and image 2), two captions (caption 1 and caption 2), and three sections (section 1, section 2, and section 3). Each section is broken down into multiple sentences (e.g., sen11, sen12, sen13, . . . , sen33) as shown. Accordingly, the output of the transformer encoder 310 includes corresponding contextual embeddings I1, I2, C1, C2, S11, S12, S13, . . . , S33.

As shown, during training time, the trimodal document relationship model 110 outputs the contextual embeddings 312 to training manager 314. Training manager 314 is responsible for determining a loss value based on positive and negative pairs of contextual embeddings. For example, as shown a scaled dot product similarity score may be calculated between each sentence and image pair. Then the sentences in the same section according to their average similarity scores. The top three sentences are picked as the candidates to the transformer encoder for contrastive learning. Before being fed into the transform encoder, all of the input sentences and images are mapped to a set of embeddings. As discussed, each embedding is computed as the sum of: 1) a sentence or image embedding encoded by the feature extractor (e.g., a pretrained CLIP model); 2) a segment embedding indicating whether it is the image, caption or section; 3) a position embedding, indicating the position of the sections and images. For instance, in FIG. 3, the position index of Image 2 is 1 and the position index of Section 3 is 2.

After generating the new contextual embedding for images, captions and section sentences, embodiments compute the similarity score between image-caption pairs with sections is by training a learnable coefficient α to combine them:

$$S(I, C, \dot{S}) = \frac{\alpha I \dot{S} + (1-\alpha) C \dot{S}}{T}$$

where T is an annealing temperature hyperparameter, and I, C, Ś are image, caption, section contextual embeddings. At training time, embodiments use ground truth pairs [I1, C1/S11] as the positive pair, where I1 is Image1, C1 is Caption1 and S11 is the Sen11. The negative pairs include two parts: normal negative pairs and hard negative pairs. In normal negative pairs, only the section items are randomly swapped with certain probability, like [I1, C1/S21]. As for the hard negative pairs, either the caption items or the image items might be changed but not both of them. For example, [I2, C1/S11] or [I1, C2/S11]. After computing the similarity for positive samples and negative samples, the scores for each image are input into a cross entropy function 316 to calculate the loss. The trimodal document relationship model 110 may then be trained based on the loss function.

At inference time, one or more strategies may be employed to identify the section of text related to an image. As discussed, these may include determining the similarity for the first sentence of every section, the last sentence of every section, or a weighted average of the similarities of every sentence of each section. Alternatively, similarity may be calculated for every sentence separately, and the sentence with the maximum similarity may be selected. The section with the sentence having the maximum similarity may then be selected as the prediction. Experimentally, this "maximum" strategy was found to be most performant.

The cross-entropy loss function encourages the image-caption pair to match only a single sentence. However, more detailed training data labeling—e.g., manually labeling all sentences according to image/text semantics instead of using automatically derived labels from layout cues—would allow for a triplet-like loss to be used, enabling images to match to multiple sentences from different parts of the main body text. In such instances, instead of selecting the single closest sentence or section, a threshold may be used and each figure with all sections/sentences that meet the required similarity threshold may be determined to be associated with the image.

Figure 4:
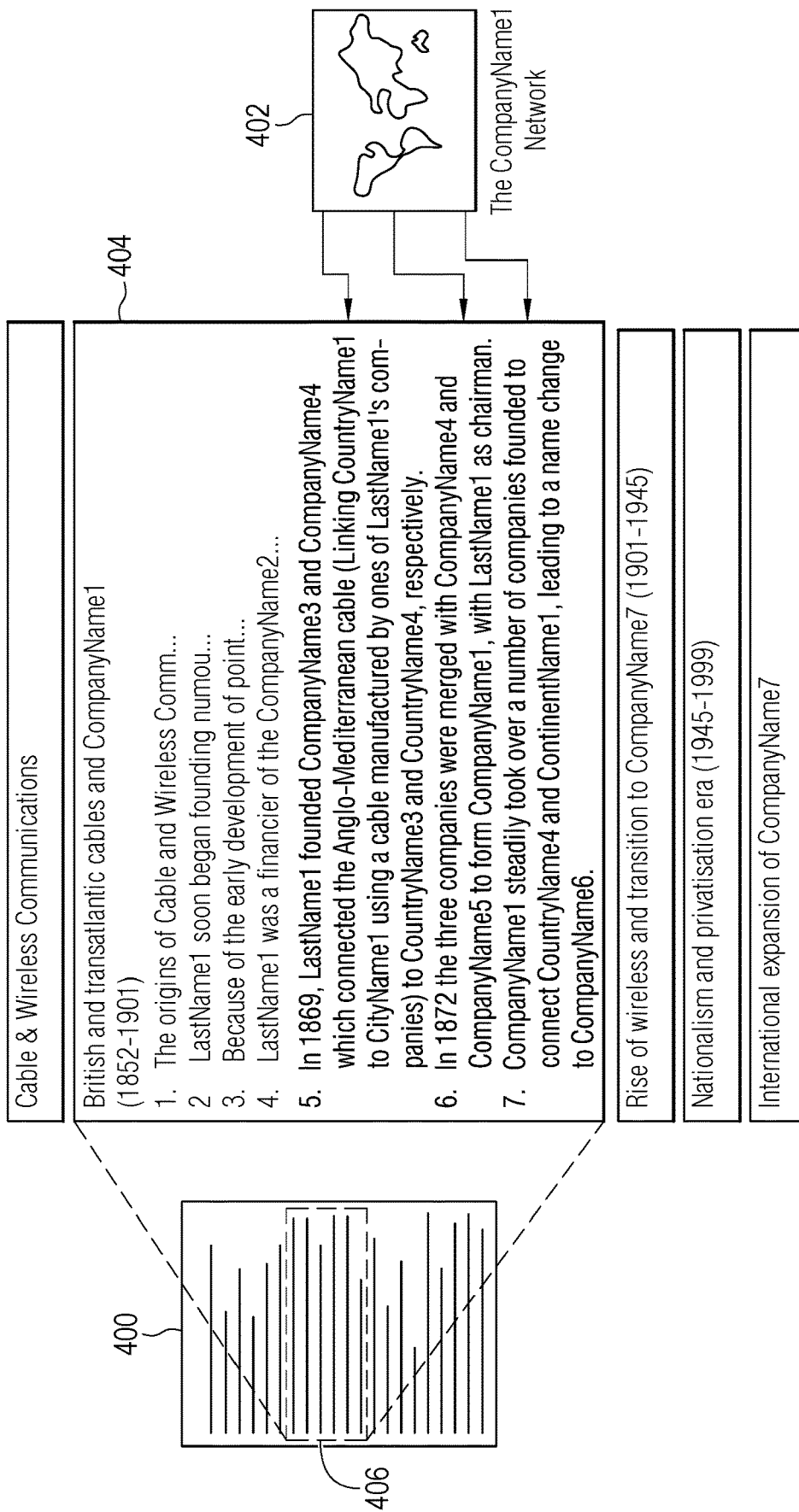
FIG. 4 illustrates an example of predicting content relationships in a document in accordance with one or more embodiments.

FIG. 4 illustrates an example of predicting content relationships in a document in accordance with one or more embodiments. As discussed, the trimodal document relationship model can be used to predict relationships between images in a document and individual sentences from the body text. In the example of FIG. 4, the trimodal document relationship model is used to predict a section of document 400 that is related to image 402. As shown, the model correctly predicts that section 404 is related to image 402, matching ground truth section 406. Additionally, the top 3 prediction includes sentences 5, 6, and 7 of section 404 which all directly reference the content shown in image 402.

Figure 5:
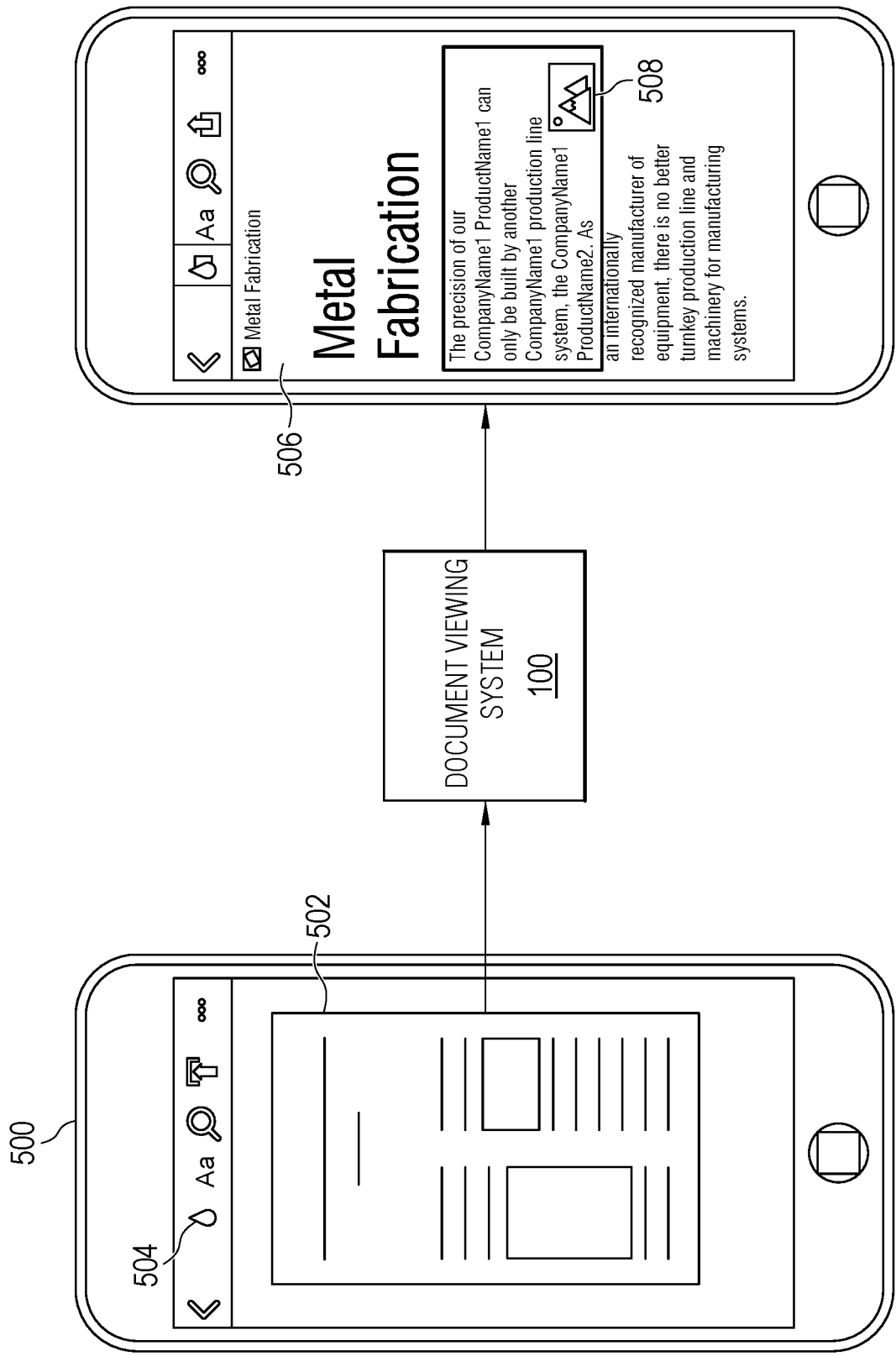
FIGS. 5-6 illustrate an example user interface for reflowing a document using a trimodal document relationship model in accordance with one or more embodiments.
Figure 6:
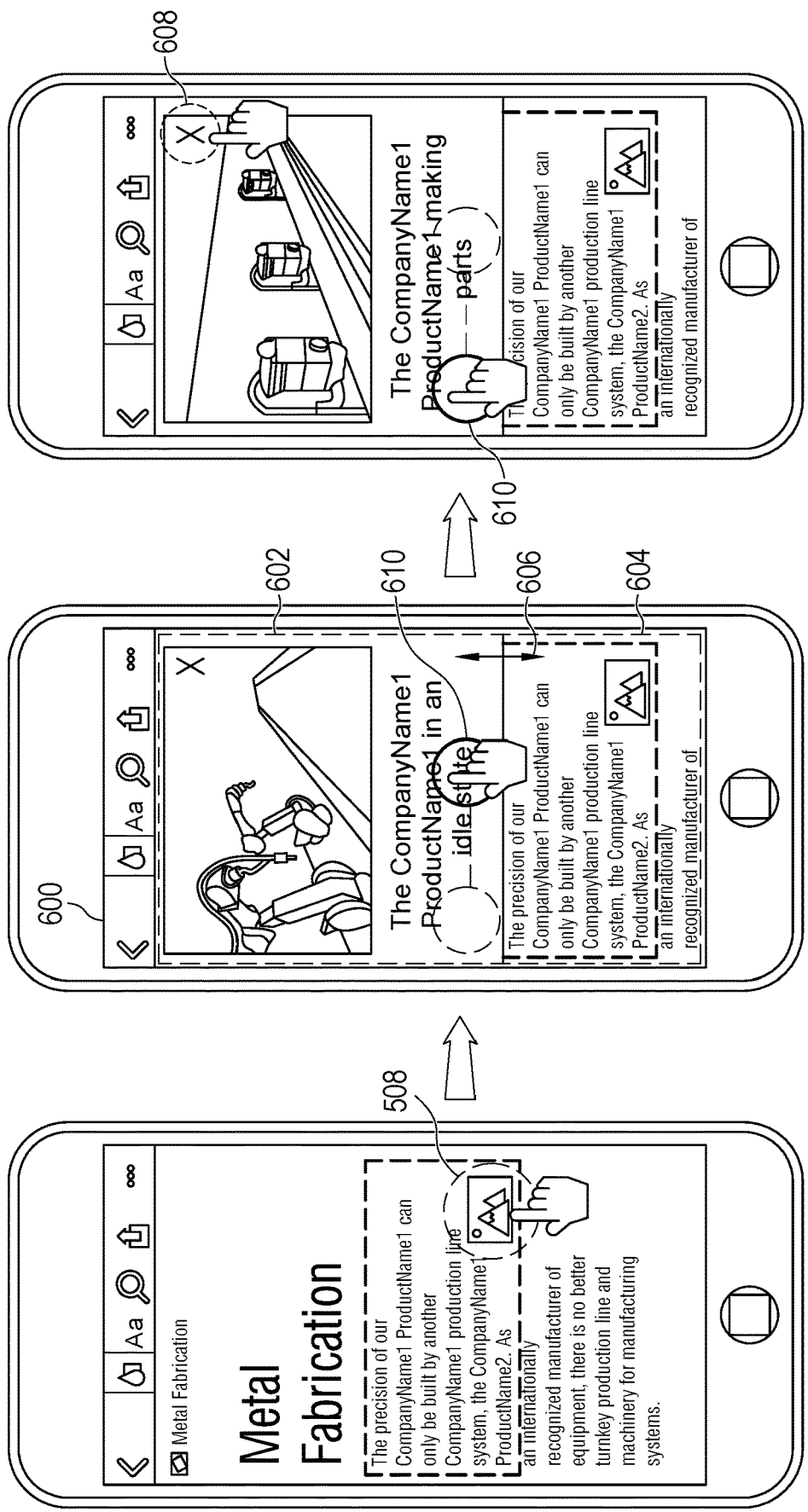

FIGS. 5-6 illustrate an example user interface for reflowing a document using a trimodal document relationship model in accordance with one or more embodiments. FIG. 5 illustrates an example of reflowing a document using document viewing system 100. As shown in FIG. 5, a user device 500 may include a mobile device, such as a smartphone or tablet. As shown, viewing a document 502, particularly static documents, can be challenging on such a device, where the layout of the document 502 is reproduced precisely, requiring the user to zoom in on portions of the document and navigate to other portions as she reads the document.

As discussed, to overcome such challenges, the user may request to reflow the document. In some embodiments, the user may send such a request by selecting a user interface element, such as user interface element 504. When selected, document viewing system 100 uses the techniques described herein to reflow document 502, resulting in reflowed document 506. As shown, reflowed document 506 is significantly easier to read by allowing the text to occupy a significantly larger portion of the screen and wrap as needed, without having to reproduce the original layout of the document. As discussed, the document viewing system 100 uses content relationships during the reflowing process to ensure images and related text remain collocated. In some embodiments, when a section of text is related to an image, a visual indicator, such as user interface element 508 may be displayed and/or the section of text may be highlighted. When the user selects the user interface element (e.g., by clicking, tapping, or otherwise interacting with the user interface element), a new view may be shown, as shown in FIG. 6.

FIG. 6 illustrates an example user interface for viewing a reflowed document that preserves spatial alignment of images and related text. As discussed, when the user selects user interface element 508, a new, split screen view 600 is shown. The split screen view 600 includes a first view pane 602 showing an image, and a second view pane 604 showing the related text.

In this split screen view, the user can continue to read the main body text by scrolling the second view pane and keep the image in view in the first view pane. If additionally highlighted text is found and its image icon is tapped, then those associated images would replace the first view pane for the previous text. Additionally, the split screen view is adjustable by interacting with dividing line 606, allowing for the size of the first pane and second pane to be resized. The user may exit out of the split screen view by interacting with the X 608 shown in the right top corner to close the top view and return to the single view UI. Additionally, multiple images may be associated with a portion of text. In such instances, the user may swipe 610 left and right on the top view to cycle through any other images associated with that same text.

This gives the user better control over their viewing experience and allows them to keep an image in view while reading the associated text. Additionally, the figures are still displayed in the linear ordering of content in the document and not just as part of the new split mode, so that users are not required to enter split mode to see all of the document content. In some embodiments, the placement of the figures in the linear ordering could be at the top of the paragraph including the spatially nearest related text.

Figure 7:
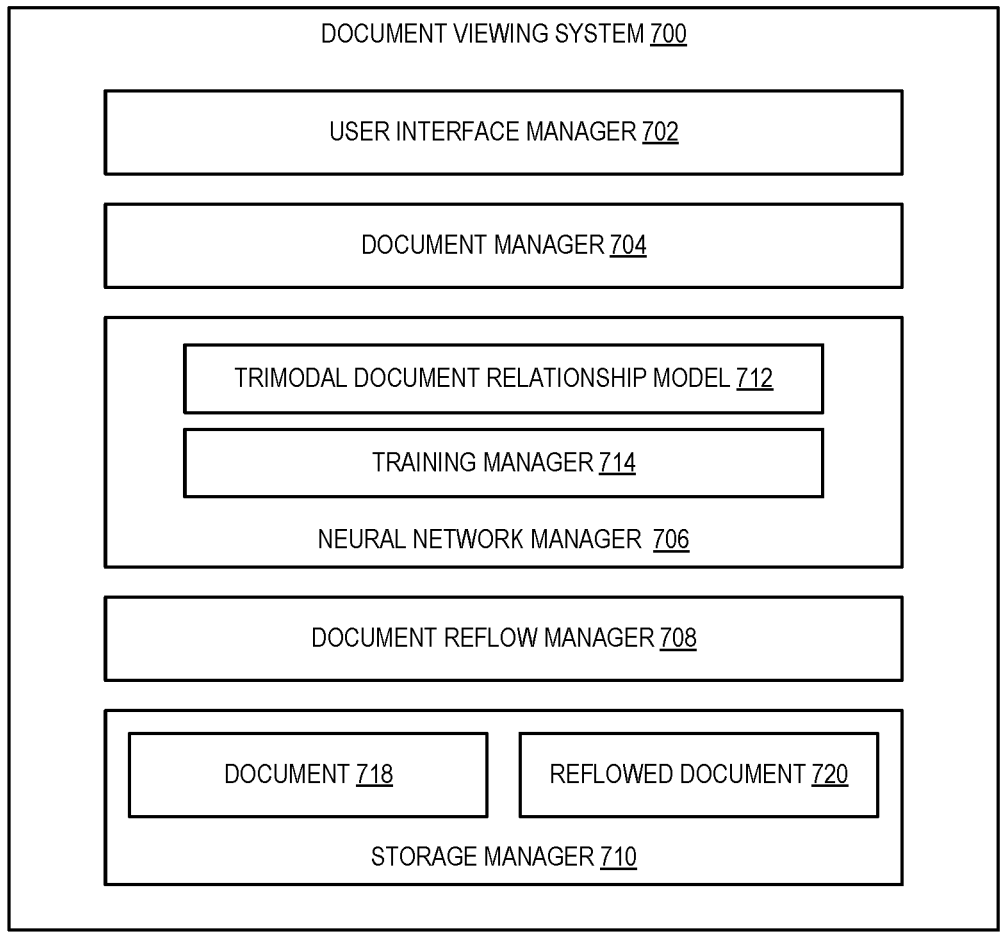
FIG. 7 illustrates a schematic diagram of a document viewing system in accordance with one or more embodiments.

FIG. 7 illustrates a schematic diagram of document viewing system (e.g., "document viewing system" described above) in accordance with one or more embodiments. As shown, the document viewing system 700 may include, but is not limited to, user interface manager 702, document manager 704, neural network manager 706, document reflow manager 708, and storage manager 710. The neural network manager 706 includes a trimodal document relationship model 712, and a training manager 714. The storage manager 710 includes a document 718, and a reflowed document 720.

As illustrated in FIG. 7, the document viewing system 700 includes a user interface manager 702. For example, the user interface manager 702 allows users to provide a document to the document viewing system 700. In some embodiments, the user interface manager 702 provides a user interface through which the user can upload the document 718 to be reflowed, as discussed above. Alternatively, or additionally, the user interface may enable the user to download the document from a local or remote storage location (e.g., by providing an address (e.g., a URL or other endpoint) associated with a document source). Additionally, the user interface manager 702 allows users to request the document viewing system 700 to reflow the document, generating reflowed document 720. In some embodiments, the user interface manager 702 enables the user to view the resulting reflowed document.

As illustrated in FIG. 7, the document viewing system 700 includes a document manager 702. The document manager 702 can receive an input document, or reference to a document, and prepare the document for the trimodal document relationship model to process. For example, as discussed, the document manager may include a parser which identifies the structural elements of the document. For example, the parser may read structural information encoded in the document to extract the document elements (e.g., images, body text, captions). Additionally, or alternatively, the document manager may implement conventional or machine learning-based techniques to identify and extract the document elements from the input document. The document elements may then be passed to the trimodal document relationship model to process.

As illustrated in FIG. 7, the document viewing system 700 also includes a neural network manager 706. Neural network manager 706 may host a one or more neural networks or other machine learning models, such as trimodal document relationship model 712. The neural network manager 706 may include an execution environment, libraries, and/or any other data needed to execute the machine learning models. In some embodiments, the neural network manager 706 may be associated with dedicated software and/or hardware resources to execute the machine learning models. Although depicted in FIG. 7 as being hosted by a single neural network manager 706, in various embodiments the neural networks may be hosted in multiple neural network managers and/or as part of different components.

As illustrated in FIG. 7 neural network manager 706 also includes training manager 714. The training manager 714 can teach, guide, tune, and/or train one or more neural networks. In particular, the training manager 714 can train a neural network based on a plurality of training data. For example, the trimodal document relationship model 712 may be trained to generate contextual embeddings for images and text content of a document, where the contextual embeddings for semantically related images and text are similar. Additionally, the trimodal document relationship model 712 may be further optimized using loss functions, as discussed above, by backpropagating gradient descents. More specifically, the training manager 714 can access, identify, generate, create, and/or determine training input and utilize the training input to train and fine-tune a neural network. For instance, the training manager 714 can train the trimodal document relationship model 712, as discussed above.

As illustrated in FIG. 7, the document viewing system 700 also includes document reflow manager 708. As discussed, document reflow manager 708 is responsible for determining semantically related content based on the contextual embeddings generated by trimodal document relationship model 712. The document reflow manager 708 can use these semantic relationships with conventional document reflowing techniques to ensure related images and text remain spatially collocated in the reflowed document. For example, as discussed, the document reflow manager 708 uses the structural information associated with a document to determine a linear order of the text elements of the document. The structural information may define a start and stop location of headings, section breaks, paragraphs, etc. As discussed, this structural information may be inferred using machine learning or other document structure extraction techniques or may be encoded into the document itself.

As such, each segment of text may be associated with a position in the linear order, allowing for the linearized view of the document to be constructed. The semantic relationship data associates images with sections of text. This allows the reflow manager to insert the images into the linearized view at specific locations associated with the associated segment of text. In some embodiments, the associated image or images may be inserted prior to the location of the associated text, after the location of the associated text, or at another spatially related position.

As illustrated in FIG. 7, the document viewing system 700 also includes the storage manager 710. The storage manager 710 maintains data for the document viewing system 700. The storage manager 710 can maintain data of any type, size, or kind as necessary to perform the functions of the document viewing system 700. The storage manager 710, as shown in FIG. 7, includes the document 718. The document 718 can include a provided by or otherwise accessible to a user which includes both text and related image content. In particular, in one or more embodiments, the document 718 includes any digital document that includes text and image content, including static and non-static documents. As further illustrated in FIG. 7, the storage manager 710 also includes reflowed document 720. Reflowed document 720 can include a reflowed version of document 718. For example, the output of document reflow manager includes reflowed document 720. The storage manager can maintain a copy of the reflowed document as the user views the document. In some embodiments, the storage manager can store a copy of the reflowed document for future viewing.

Each of the components 702-710 of the document viewing system 700 and their corresponding elements (as shown in FIG. 7) may be in communication with one another using any suitable communication technologies. It will be recognized that although components 702-710 and their corresponding elements are shown to be separate in FIG. 7, any of components 702-710 and their corresponding elements may be combined into fewer components, such as into a single facility or module, divided into more components, or configured into different components as may serve a particular embodiment.

The components 702-710 and their corresponding elements can comprise software, hardware, or both. For example, the components 702-710 and their corresponding elements can comprise one or more instructions stored on a computer-readable storage medium and executable by processors of one or more computing devices. When executed by the one or more processors, the computer-executable instructions of the document viewing system 700 can cause a client device and/or a server device to perform the methods described herein. Alternatively, the components 702-710 and their corresponding elements can comprise hardware, such as a special purpose processing device to perform a certain function or group of functions. Additionally, the components 702-710 and their corresponding elements can comprise a combination of computer-executable instructions and hardware.

Furthermore, the components 702-710 of the document viewing system 700 may, for example, be implemented as one or more stand-alone applications, as one or more modules of an application, as one or more plug-ins, as one or more library functions or functions that may be called by other applications, and/or as a cloud-computing model. Thus, the components 702-710 of the document viewing system 700 may be implemented as a stand-alone application, such as a desktop or mobile application. Furthermore, the components 702-710 of the document viewing system 700 may be implemented as one or more web-based applications hosted on a remote server. Alternatively, or additionally, the components of the document viewing system 700 may be implemented in a suite of mobile device applications or "apps."

As shown, the document viewing system 700 can be implemented as a single system. In other embodiments, the document viewing system 700 can be implemented in whole, or in part, across multiple systems. For example, one or more functions of the document viewing system 700 can be performed by one or more servers, and one or more functions of the document viewing system 700 can be performed by one or more client devices. The one or more servers and/or one or more client devices may generate, store, receive, and transmit any type of data used by the document viewing system 700, as described herein.

In one implementation, the one or more client devices can include or implement at least a portion of the document viewing system 700. In other implementations, the one or more servers can include or implement at least a portion of the document viewing system 700. For instance, the document viewing system 700 can include an application running on the one or more servers or a portion of the document viewing system 700 can be downloaded from the one or more servers. Additionally or alternatively, the document viewing system 700 can include a web hosting application that allows the client device(s) to interact with content hosted at the one or more server(s).

For example, upon a client device accessing a webpage or other web application hosted at the one or more servers, in one or more embodiments, the one or more servers can provide access to one or more documents stored at the one or more servers. Moreover, the client device can receive a request (i.e., via user input) to reflow the document for view on the client device and the request may be passed to the one or more servers. Upon receiving the request, the one or more servers can automatically perform the methods and processes described above to reflow the document. The one or more servers can provide the reflowed document, to the client device for display to the user.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 9. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 9.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 9.

Figure 8:
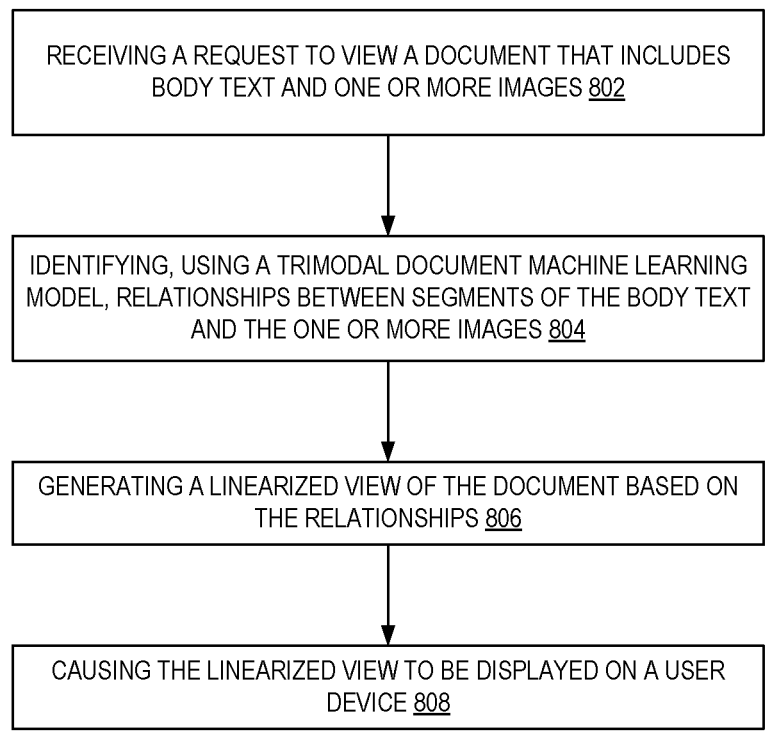
FIG. 8 illustrates a flowchart of a series of acts in a method of reflowing documents to display semantically related content in accordance with one or more embodiments.

FIGS. 1-7, the corresponding text, and the examples, provide a number of different systems and devices that enable reflowing documents to display semantically related content. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with fewer or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart 800 of a series of acts in a method of reflowing documents to display semantically related content in accordance with one or more embodiments. In one or more embodiments, the method 800 is performed in a digital medium environment that includes the document viewing system 700. The method 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the method 800 includes an act 802 of receiving a request to view a document that includes body text and one or more images. As discussed, a user may provide a document (e.g., open a local document, download a document from a local or remote network location, etc.) to a document viewing system (e.g., a document viewing application). The user may interact with a user interface provided by the document viewing system to request that the document be reflowed for their device.

As illustrated in FIG. 8, the method 800 includes an act 804 of identifying, using a trimodal document relationship model, relationships between segments of the body text and the one or more images. The document viewing system may include a trimodal document relationship model which has been trained to determine semantic relationships between segments of body text (e.g., sections, paragraphs, sentences, etc.) and images of the document. In some embodiments the trimodal document relationship model includes a transformer encoder which generates a contextual embedding for each segment of the body text, image, and associated caption.

In some embodiments, identifying the relationships further includes receiving, by the trimodal document relationship model, a plurality of segments of the body text, the one or more images, and one or more associated captions from the document and predicting at least one segment of the body text associated with each image from the one or more images. In some embodiments, predicting the at least one segment associated with each image from the one or more images further includes determining a similarity score between a plurality of image-caption pairs and segments of the body text based on their contextual embeddings, wherein the contextual embedding encodes a combination of an image or text embedding, a segment embedding defining a segment type, and a position embedding indicating a position of the segment of body text, image, or associated caption, and wherein the prediction is based on the similarity score.

As illustrated in FIG. 8, the method 800 includes an act 806 of generating a linearized view of the document based on the relationships. In some embodiments, the linearized view is a linear presentation of the segments of the body text, wherein each segment of the body text determined to be associated with an image from the one or more images has an associated user interface element rendered in the linearized view. As discussed, the images can be inserted into the linearized view at a location corresponding to the associated segment of text (e.g., just before, just after, etc.).

As illustrated in FIG. 8, the method 800 includes an act 808 of causing the linearized view to be displayed on a user device. The reflowed document can be more readily read by the user on the user device. Additionally, the reflowed document can provide access to related content in a split screen view. For example, in some embodiments, a selection of a first user interface element associated with a first segment of the body text in the linearized view is receives, which causes an adjustable split screen to be displayed on the user device. A first pane of the split screen displays a first image determined to be associated with the first segment, and a second pane of the split screen displays at least some of the first segment of the body text.

In some embodiments, multiple images are associated with the first segment of the body text, and wherein the first screen of the split screen includes a second user interface element which, when selected, causes a different image from the multiple images to be displayed in the first screen. In some embodiments, the first pane and the second pane of the adjustable split screen are resizable using an interactive user interface element.

In some embodiments, a method comprises receiving, by a trimodal document relationship model, a plurality of elements of a document, wherein the elements include segments of body text, images, and image captions, generating, by a feature extractor of the trimodal document relationship model, an element embedding for each element of the document, generating a segment embedding, indicating an element type, and a position embedding, indicating an element position within the document, for each element of the document, combining each element embedding, segment embedding, and position to create a combined embedding for each element of the document, generating, by a transformer encoder of the trimodal document relationship model, a contextual embedding for each element of the document corresponding to each combined embedding, and determining semantic relationships between the segments of the body text and the images in the document using their contextual embeddings.

In some embodiments, the operations further include generating a reflowed document based on the semantic relationships. In some embodiments, the operation of determining semantic relationships between the segments of the body text and the images in the document using their contextual embeddings further includes determining a similarity score between a plurality of image-caption pairs and segment sentences based on their contextual embeddings, the similarity score indicating a likelihood that an image is associated with a segment.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
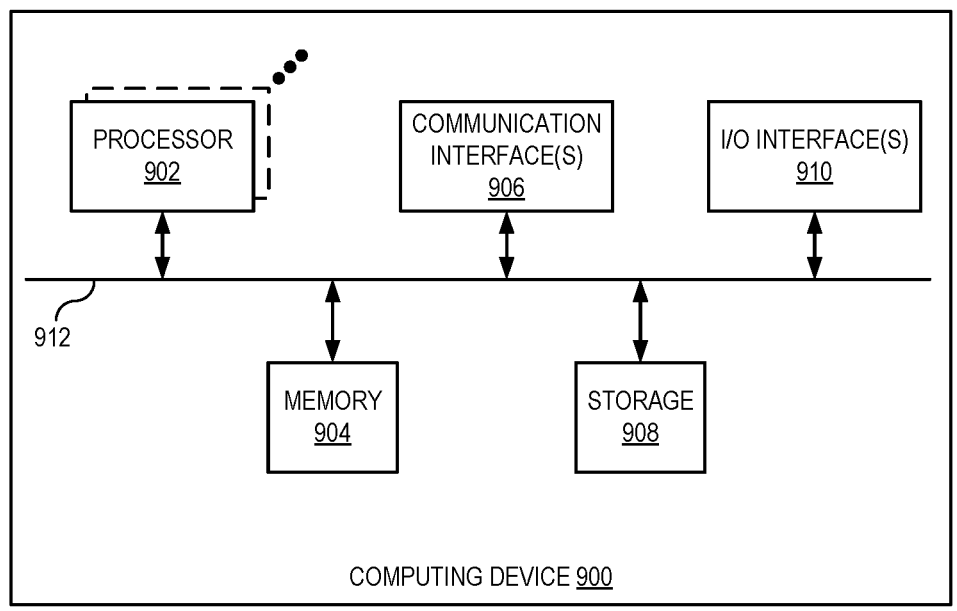
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the document viewing system. As shown by FIG. 9, the computing device can comprise a processor 902, memory 904, one or more communication interfaces 906, a storage device 908, and one or more I/O devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination these or other storage devices. The computing device 900 also includes one or more input or output ("I/O") devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method, comprising: receiving a request to view a document that includes body text, one or more images, and one or more associated captions;
    identifying, using a trimodal document relationship model, relationships between segments of the body text and the one or more images, wherein the trimodal document relationship model: generates a contextual embedding for each segment of the body text, image, and associated caption, and
    predicts at least one segment of the body text associated with each image from the one or more images based on a similarity score determined between a plurality of image-caption pairs and segments of the body text based on their contextual embeddings which encode a combination of image embeddings, text embeddings, segment embeddings, and position embeddings;
    generating a linearized view of the document based on the relationships; and
    causing the linearized view to be displayed on a user device.

2. The method of claim 1, wherein identifying, using a trimodal document relationship model, relationships between segments of the body text and the one or more images, further comprises:
    receiving, by the trimodal document relationship model, a plurality of segments of the body text, the one or more images, and one or more associated captions from the document.

3. The method of claim 2, wherein the trimodal document relationship model includes a transformer encoder.

4. The method of claim 3, wherein each segment embedding defines a segment type and each position embedding indicates a position of the segment of body text, image, or associated caption.

5. The method of claim 1, wherein a segment of body text includes a section, a paragraph, or a sentence.

6. The method of claim 1, wherein the linearized view is a linear presentation of the segments of the body text, wherein each segment of the body text determined to be associated with an image from the one or more images has an associated user interface element rendered in the linearized view.

7. The method of claim 6, further comprising:
    receiving a selection of a first user interface element associated with a first segment of the body text in the linearized view; and
    causing an adjustable split screen to be displayed on the user device, wherein a first pane of the split screen displays a first image determined to be associated with the first segment, and a second pane of the split screen displays at least some of the first segment of the body text.

8. The method of claim 7, wherein multiple images are associated with the first segment of the body text, and wherein the first screen of the split screen includes a second user interface element which, when selected, causes a different image from the multiple images to be displayed in the first screen.

9. The method of claim 7, wherein the first pane and the second pane of the adjustable split screen are resizable using an interactive user interface element.

10. A non-transitory computer-readable medium storing executable instructions, which when executed by a processing device, cause the processing device to perform operations comprising: receiving a request to view a document that includes body text, one or more images, and one or more associated captions;
    identifying, using a trimodal document relationship model, relationships between segments of the body text and the one or more images, wherein the trimodal document relationship model: generates a contextual embedding for each segment of the body text, image, and associated caption, and
    predicts at least one segment of the body text associated with each image from the one or more images based on a similarity score determined between a plurality of image-caption pairs and segments of the body text based on their contextual embeddings which encode a combination of image embeddings, text embeddings, segment embeddings, and position embeddings;
    generating a linearized view of the document based on the relationships; and
    causing the linearized view to be displayed on a user device.

11. The non-transitory computer-readable medium of claim 10, wherein the operation of identifying, using a trimodal document relationship model, relationships between segments of the body text and the one or more images, further comprises:
  receiving, by the trimodal document relationship model, a plurality of segments of the body text, the one or more images, and one or more associated captions from the document.

12. The non-transitory computer-readable medium of claim 11, wherein the trimodal document relationship model includes a transformer encoder.

13. The non-transitory computer-readable medium of claim 12, wherein each segment embedding defines a segment type and each position embedding indicates a position of the segment of body text, image, or associated caption.

14. The non-transitory computer-readable medium of claim 10, wherein the linearized view is a linear presentation of the segments of the body text, wherein each segment of the body text determined to be associated with an image from the one or more images has an associated user interface element rendered in the linearized view.

15. The non-transitory computer-readable medium of claim 14, wherein the operations further comprise:
  receiving a selection of a first user interface element associated with a first segment of the body text in the linearized view; and
  causing an adjustable split screen to be displayed on the user device, wherein a first pane of the split screen displays a first image determined to be associated with the first segment, and a second pane of the split screen displays at least some of the first segment of the body text.

16. The non-transitory computer-readable medium of claim 15, wherein multiple images are associated with the first segment of the body text, and wherein the first screen of the split screen includes a second user interface element which, when selected, causes a different image from the multiple images to be displayed in the first screen.

17. The non-transitory computer-readable medium of claim 15, wherein the first pane and the second pane of the adjustable split screen are resizable using an interactive user interface element.

18. A system, comprising:
a memory component; and
a processing device coupled to the memory component, the processing device to perform operations comprising:
  receiving, by a trimodal document relationship model, a plurality of elements of a document, wherein the elements include segments of body text, images, and image captions;
  generating, by a feature extractor of the trimodal document relationship model, an element embedding for each element of the document;
  generating a segment embedding, indicating an element type, and a position embedding, indicating an element position within the document, for each element of the document;
  combining each element embedding, segment embedding, and position to create a combined embedding for each element of the document;
  generating, by a transformer encoder of the trimodal document relationship model, a contextual embedding for each element of the document corresponding to each combined embedding; and
  determining semantic relationships between the segments of the body text and the images in the document using their contextual embeddings.

19. The system of claim 18, wherein the operations further comprise:
  generating a reflowed document based on the semantic relationships.

20. The system of claim 18, wherein the operation of determining semantic relationships between the segments of the body text and the images in the document using their contextual embeddings further comprises:
  determining a similarity score between a plurality of image-caption pairs and segment sentences based on their contextual embeddings, the similarity score indicating a likelihood that an image is associated with a segment.

* * * * *